United States Patent
Winefordner et al.

(10) Patent No.: US 12,042,911 B2
(45) Date of Patent: Jul. 23, 2024

(54) TOOL STORAGE ASSEMBLY, AND HEAD TUBE ASSEMBLY INCLUDING THE TOOL STORAGE ASSEMBLY

(71) Applicant: Crank Brothers, Inc., Laguna Beach, CA (US)

(72) Inventors: Carl Winefordner, Laguna Beach, CA (US); Frank Hermansen, Laguna Beach, CA (US)

(73) Assignee: CRANK BROTHERS, INC., Laguna Beach, CA (US)

( * ) Notice: Subject to any disclaimer, the term of this patent is extended or adjusted under 35 U.S.C. 154(b) by 333 days.

(21) Appl. No.: 16/725,314

(22) Filed: Dec. 23, 2019

(65) Prior Publication Data

US 2021/0187713 A1   Jun. 24, 2021

(51) Int. Cl.
| | |
|---|---|
| *B25B 27/00* | (2006.01) |
| *B25B 13/50* | (2006.01) |
| *B25B 15/00* | (2006.01) |
| *B62J 11/22* | (2020.01) |
| *B62K 19/32* | (2006.01) |
| *B62K 21/02* | (2006.01) |

(52) U.S. Cl.
CPC ...... *B25B 27/0071* (2013.01); *B25B 13/5008* (2013.01); *B25B 15/008* (2013.01); *B62J 11/22* (2020.02); *B62K 19/32* (2013.01); *B62K 21/02* (2013.01)

(58) Field of Classification Search
CPC ........... B25B 27/0071; B25B 13/5008; B25B 15/008; B25F 1/04; B62J 11/22; B62J 9/40; B62J 19/32; B62J 21/02

USPC ............................................................ 7/138
See application file for complete search history.

(56) References Cited

U.S. PATENT DOCUMENTS

| | | | |
|---|---|---|---|
| 6,044,508 A * | 4/2000 | Chuang | B25B 27/0071 7/138 |
| 2005/0078480 A1* | 4/2005 | Xingguo | B25B 13/56 362/253 |
| 2012/0255273 A1* | 10/2012 | Wang | B25F 1/04 59/7 |
| 2017/0166346 A1* | 6/2017 | Cornell | B65D 1/04 |
| 2017/0292507 A1* | 10/2017 | Staples | B62K 19/32 |

FOREIGN PATENT DOCUMENTS

| | | |
|---|---|---|
| CN | 102615631 B * | 9/2014 |
| KR | 101577240 B1 * | 12/2015 |

OTHER PUBLICATIONS

Translation of KR101577240B1, retrieved from espacenet on Mar. 14, 2023 (Year: 2015).*
Translation of CN102615631b (Year: 2014).*

* cited by examiner

*Primary Examiner* — Tom Rodgers
(74) *Attorney, Agent, or Firm* — Tutunjian & Bitetto, P.C.

(57) ABSTRACT

A tool storage assembly, including a container assembly, and at least a multi-tool assembly, removably connected to said container assembly, wherein said container assembly and said multi-tool assembly comprise respective sliding connection portions that engage each other.

11 Claims, 11 Drawing Sheets

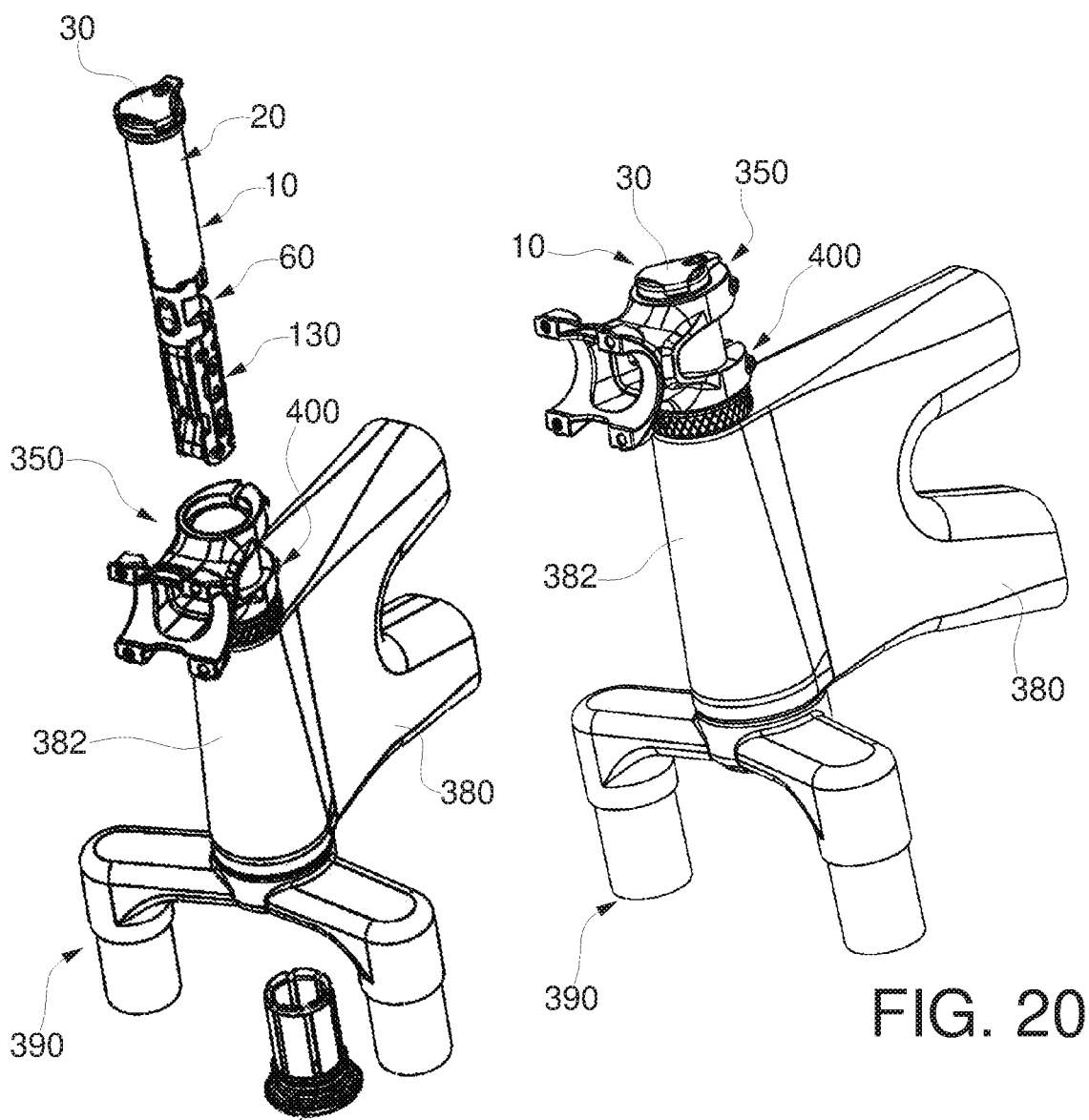
FIG. 19
FIG. 20
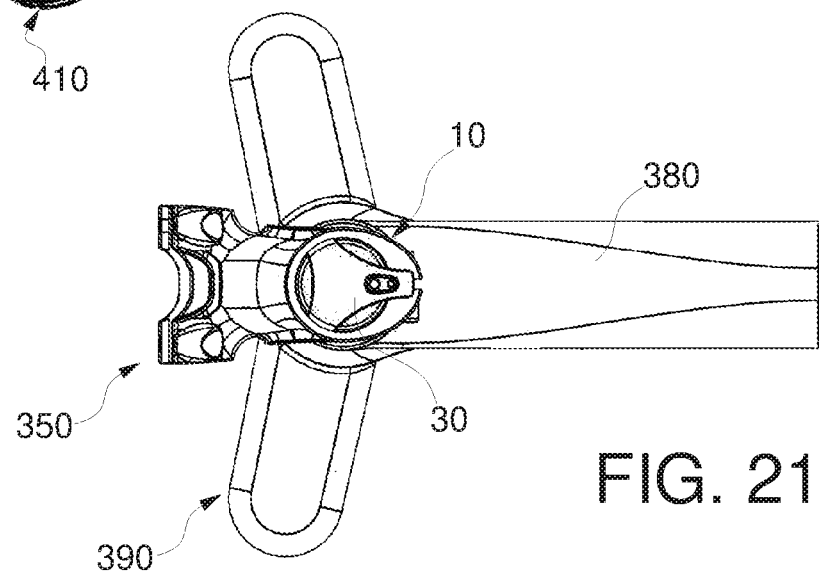
FIG. 21

TOOL STORAGE ASSEMBLY, AND HEAD TUBE ASSEMBLY INCLUDING THE TOOL STORAGE ASSEMBLY

FIELD OF THE INVENTION

The present invention relates to a tool storage assembly, and to a head tube assembly including such tool storage assembly.

BACKGROUND OF THE INVENTION

A bicycle headset assembly is typically designed to allow smooth rotational fork movement with respect to the bicycle frame, while minimizing the degree of "slack" or "play" (i.e. the amount of movement) between the fork and the bicycle frame.

Upper and lower bearings between the fork steer tube and the frame head tube must be preloaded just enough to remove play, and not too much to cause binding. The most common system has a star nut jammed inside the fork steer tube, a screw tightened in the star nut, and a cap on top of the stem.

As the cap screw is tightened, the upper and lower bearings are squeezed between the stem and the fork, in order to eliminate the slack; then, the stem screws are tightened, while the stem is aligned with the front wheel.

In this case, the star nut blocks the inside of the fork steerer tube, and it prevents installing items inside, such as a tool kit.

In other solutions currently on the market, the nut screw is replaced by an expanding top cap plug assembly, pushed into the fork steer tube, which, when tightened, preloads the headset assembly.

In some other headset tightening systems of the known kind, for example the one disclosed in U.S. Pat. No. 10,197,049 (FIGS. 1 and 2), threads are cut in the inner surface of the fork steer tube, and a threaded top cap is installed which, when tightened, preloads the headset bearings.

There are several significant disadvantages in this solution, including the necessity to cut threads into the fork steer tube, a reduction of the internal diameter for inserting a tool assembly, a weakening of the fork steer tube, the restriction of not using the device with certain fork steer tube materials, and the requirement to use a special tool for adjusting the headset preload.

In the same document (see attached FIGS. 1, 2), a tool kit 500 is also disclosed, which can be inserted inside the fork steer tube for storage, sliding through the treaded top cap 526.

The tool kit 500, which is cylindrical, includes a supporting body 510, suitable for holding a multi tool 518, a tire lever 524, and a chain breaker 528.

The supporting body 510 has a first end 512 and a second end 514, connected by an elongated mounting arm 516.

Multi tool 518, tire lever 524, and chain breaker 528 are housed between ends 512, 514.

Also, a container 522 is connected to the supporting body 510.

The above described solution has some drawbacks.

The internal diameter of the threaded top cap 526 is smaller than the internal diameter of the fork steer tube, which causes the outer diameter of the tool kit 500 to be smaller than it could be without the threaded top cap 526.

This reduction in diameter of the tool kit 500 has a profound effect on the usability of the tool kit 500.

For example, multi tool 518 has fewer tools than ideal, and container 522 is not big enough to hold a standard $CO_2$ canister for emergency tire inflation.

The mounting arm 516 takes up valuable space that could otherwise be used for a practical purpose, such as a tool.

It is difficult to install and remove tools stored between ends 512,514; for removal and installation, the mounting arm 516 must be significantly flexed, in order to tire lever 524 to release from end 512, and multi tool 518 and chain breaker 528 must be correctly aligned, in order to fit properly.

Normally, fork steer tubes are threadless, and using tool kit 500 requires threading the fork steer tube.

This requires using an expensive tap, which most riders do not have, and it is difficult to perform; furthermore, a thread weakens the steer tube, and in many cases, it voids the fork warranty.

Additionally, this threading is only recommended to be done on aluminum steer tubes and not on steel tubes, or on carbon steer tubes.

It should also be noted that top cap 526 requires a special tool for adjusting, and such tool is included in multi tool 518, at the expense of eliminating a more common and useful tool.

OBJECTS OF THE INVENTION

The technical aim of the present invention is therefore to improve the state of the art in the field of multiple tools.

Within such technical aim, it is an object of the invention to develop a multiple tool assembly which is suitable to be inserted in a predetermined space, or cavity inside a bicycle frame (for example the steer tube).

A further object of the present invention is to develop a multiple tool assembly which is easy to assemble together prior to the insertion into the predetermined space in the bicycle frame, and easy to disassemble after it has been removed from the same space.

Still another object of the present invention is to devise a multiple tool assembly which in which the components are linked together in such a way that they are prevented from detaching from each other when stored inside the predetermined space, or cavity, of the bicycle frame.

SUMMARY OF THE INVENTION

This aim and these objects are all achieved by a tool storage assembly, comprising a first multi-tool assembly, including a plurality of tool bits, each of which is movable from an inactive position, of minimum encumbrance, and an operative position, and a container assembly, removably connected to the first tool assembly.

The first tool assembly and the container comprise respective first sliding connection members and second sliding connection members that engage each other.

The solutions disclosed hereafter address the needs of bikers, and they provide improvements over existing bicycle tool storage devices.

Such solutions permit a user to store bicycle tools in a bicycle head tube assembly, or in another predetermined space provided in the bicycle frame, or even in a bicycle pump.

In fact, the solution of tool storage assembly according to the invention is very compact, and it can be inserted into internal volumes of the bicycle frame, making the most of the available space.

The objects of the invention are also achieved by a head tube assembly, including a head tube; a fork assembly which, in turn, includes a fork tube comprising, at its opposite ends, a first bearing recess and a second bearing recess; a stem assembly, connected to said fork tube, and configured to clamp a bicycle handlebar; a headset assembly, including a first bearing assembly and a second bearing assembly, inserted along said fork tube and press fit, respectively, into said first bearing recess and said second bearing recess; a headset tightener, configured to properly tighten the headset assembly; and a tool storage assembly, according to the invention, housed into the fork tube.

According to an aspect of the invention, the headset tightener includes an outer ring and an inner ring, connected to said outer ring by means of a threaded coupling; the inner ring is configured to engage the top of the fork tube, so that no relative rotation is allowed between the inner ring and the fork tube.

Twisting the outer ring, by hand, causes the headset assembly to be properly preloaded, by axially loading the bearing assemblies.

The head tube assembly according to the invention, including the headset tightener, allows the headset assembly to be properly tightened without restricting the inside diameter of the fork tube, and without needing to thread the inside of the fork tube.

The outer ring of the headset tightener can be rotated by hand, and it can be locked, very simply, with an Allen key.

This allows to achieve the maximum space available, within the fork tube, for inserting the tool storage assembly.

BRIEF DESCRIPTION OF THE DRAWINGS

These and other advantages will be better understood by one skilled in the art from the following description that follows and from the attached drawings, given as a non-limiting example, in which:

FIG. 19 is a perspective view of the tool storage assembly ready to be installed into the head tube assembly, according to the invention;

FIG. 20 is a perspective view of the head tube assembly with the tool storage assembly already installed;

FIG. 21 is a top view of the head tube assembly, with the tool storage assembly installed;

DETAILED DESCRIPTION OF THE INVENTION

With reference to FIGS. 3-16, a tool storage assembly according to the invention is wholly indicated with 10.

According to the invention, tool storage assembly 10 includes at least a multi-tool assembly 60, 130, and a container assembly 20.

In a preferred embodiment of the invention, tool storage assembly 10 comprises a first multi-tool assembly 130, a second multi-tool assembly 60, and a container assembly 20.

The first multi-tool assembly 130, the second multi-tool assembly 60, and the container assembly 20 are removably connected to each other.

Figure 7:
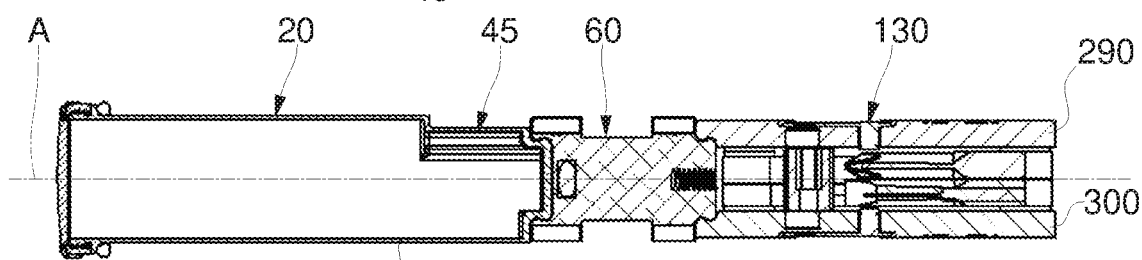
FIG. 7 is a section view of the tool storage assembly, taken along plane VII-VII of FIG. 5.

More in detail, and according to an aspect of the invention, the first multi-tool assembly 130, the second multi-tool assembly 60, and the container assembly 20 are removably connected to each other, so to be mutually aligned along an axis A (the same axis A), see for example FIG. 7.

This feature allows the tool storage assembly 10 to have a minimum encumbrance in the transverse direction, so to be stored in a small available space, for example a space provided within a bicycle frame.

For example, such space can be the steer tube of the bicycle frame, or any other suitable portion of the bicycle frame.

According to another aspect of the invention, the first multi-tool assembly 130, the second multi-tool assembly 60, and the container assembly 20 comprise respective sliding connection portions 291, 91, 92, 41, in order to connect to each other in a removable way, as better explained later.

The tool storage assembly 10 has a cylindrical, or substantially cylindrical, shape.

In assembled configuration, the axis of cylindrical symmetry of tool storage assembly 10 coincides with axis A.

More in detail, each of the first multi-tool assembly 130, second multi-tool assembly 60, and container assembly 20 has a cylindrical, or substantially cylindrical, outer surface.

The first multi-tool assembly 130 includes a plurality of tool bits 140, 150, 160, 170, 180, 190, 200, 210, 220, 230.

Each of the tool bits 140, 150, 160, 170, 180, 190, 200, 210, 220 is selectively movable between a respective inactive position, of minimum encumbrance, and a respective operative position, in which each tool bit 140, 150, 160, 170, 180, 190, 200, 210, 220 can be used, according to its specific function.

The first multi-tool assembly 130 includes a first frame bar 290 and a second frame bar 300, reciprocally connected.

The first frame bar 290 and the second frame bar 300 are reciprocally connected by a plurality of threaded axles 250, and respective screws 240 (four threaded axles 250 and eight screws 240).

The first frame bar 290 and the second frame bar 300 have radiused edges, so that their external shape is substantially cylindrical.

Each of the first frame bar 290 and second frame bar 300 includes respective holes 292, 302.

In particular, the first frame bar 290 includes four respective first holes 292, arranged side by side next to the opposite short sides; in the same way, the second frame bar 300 includes four respective second holes 302, arranged side by side next to the opposite short sides.

The eight screws 240 engage the four threaded axles 250 from opposite sides, passing through the first holes 292 and second holes 302, so to reciprocally connect the first frame bar 290 to the second frame bar 300.

Around each threaded axle 250, a certain number of tool bits 140, 150, 160, 170, 180, 190, 200, 210, 220 is pivoted.

More in detail, at least two (or even three) of the tool bits 140, 150, 160, 170, 180, 190, 200, 210, 220 are pivoted, side by side, around each threaded axle 250.

Side washers 260 are inserted along the threaded axles 250, between the tool bits 140, 150, 160, 170, 180, 190, 200, 210, 220 and first and second frame bars 290,300.

Central washers 270 are inserted along the threaded axles 250 as well, between the tool bits 140, 150, 160, 170, 180, 190, 200, 210, 220.

Each of the tool bits 140, 150, 160, 170, 180, 190, 200, 210, 220 (see, for example, FIG. 14) includes a respective pivot portion 142, and a respective operative portion 144.

The pivot portion 142 of each of the tool bits 140, 150, 160,170, 180, 190, 200, 210, 220 is substantially ring-shaped; the operative portion 144 of each of the tool bits 140, 150, 160, 170, 180, 190, 200, 210, 220 may include, for example, screwdrivers, Allen wrenches, and others, having different shapes and dimensions (without limitations to the purposes of the present invention).

The inner surfaces of the first frame bar 290 and of the second frame bar 300 include respective inner seats 294, in which respective magnets 280 are fixed.

Magnets 280 are configured to hold a further tool bit 230 (for example a socket wrench, or the like) between first frame bar 290 and second frame bar 300.

First frame bar 290 and second frame bar 300 further comprise respective outer seats 444, for housing respective chain master links 440.

Outer seats 444 include respective holes 296,306, passing through first frame bar 290 and second frame bar 300.

Chain master links 440 have respective pins 442, which engage holes 296,306, so that the outer surface of first multi-tool assembly 130 is substantially smooth.

Second multi-tool assembly 60 (FIGS. 11,15,16) includes, in an embodiment of the invention, a chainbreaker 62, and a $CO_2$ inflator 64.

In addition, second multi-tool assembly 60 includes a spoke wrench 66.

More in detail, second multi-tool assembly 60 includes a body 90.

Body 90 is substantially cylindrical-shaped.

Chainbreaker 62 includes a first threaded seat 68, made in body 90; the axis of the first threaded seat 68 is parallel to the axis of cylindrical symmetry B of body 90.

Chainbreaker 62 further includes a first screw pin 120, which is engaged in the first threaded seat 68.

The first threaded seat 68 communicates with a recess 69, made in the lateral surface of body 90.

The purpose of first screw pin 120 is to push a chain pin in or out of a chain link, depending upon how the chain link is placed onto body 90 (in particular, within recess 69).

$CO_2$ inflator 64 includes a second threaded seat 72 (FIGS. 15, 16), made in body 90; the axis of the second threaded seat 72 is parallel to the axis of cylindrical symmetry of body 90.

Figure 8:
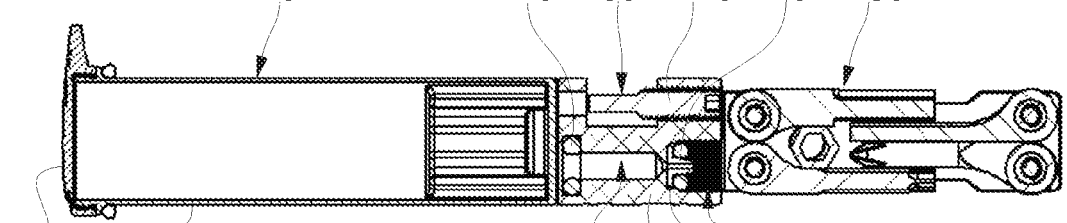
FIG. 8 is a section view of the tool storage assembly, taken along plane VIII-VIII of FIG. 6.

Second threaded seat 72 communicates with a channel 73 passing through body 90 (FIG. 8).

$CO_2$ inflator 64 includes a second screw pin 80, which is engaged in said second threaded seat 72.

$CO_2$ inflator 64 further includes O-ring seals 70,110, engaged in second threaded seat 72 and channel 73.

The purpose of second screw pin 80 is to puncher a hole in the end of a $CO_2$ bottle.

Spoke wrench 66 includes spoke wrench slots 99, of various standard sizes, made in body 90.

Spoke wrench slots 99 are achieved along the lateral surface of body 90, and they are parallel to the axis of cylindrical symmetry of body 90.

According to a further aspect of the invention, container assembly 20 includes a container 40.

Container 40 is cylindrical shaped, or substantially cylindrical shaped, and it has a cylindrical symmetry axis C; container 40 has an opening, particularly a threaded opening 55.

Container assembly 20 further includes a lid 30, associated with the container 40.

Lid 30 is engaged in threaded opening 55 of container 40; lid 30 includes a flange 34.

An O-ring seal 50 is interposed between lid 30 and threaded opening 55, to obtain the tight seal of container 40.

Container 40 can house, for example, a $CO_2$ bottle, or any other object, or tool. According to an aspect of the invention, sliding connection portions 291, 91, 92, 41 are of the hook type.

In other words, each of said first multi-tool assembly 130, second multi-tool assembly 60, and container assembly 20, include at least a respective pair of hook-shaped sliding connection portions 291, 91, 92, 41, or dovetail-shaped sliding connection portions 291, 91, 92, 41.

The hook-shaped (or dovetail-shaped) sliding connection portions 291, 91, 92, 41 are configured in such a way to engage/disengage each other, in a sliding manner, along directions perpendicular to the aforementioned axis A (therefore, along directions which are perpendicular to the axis of cylindrical symmetry of tool storage assembly 10).

Such hook-shaped sliding connection portions 291, 91, 92, 41, or dovetail-shaped sliding connection portions 291, 91, 92, 41 can have rounded edges, for more practical mutual coupling, and more comfortable use.

Figure 9:
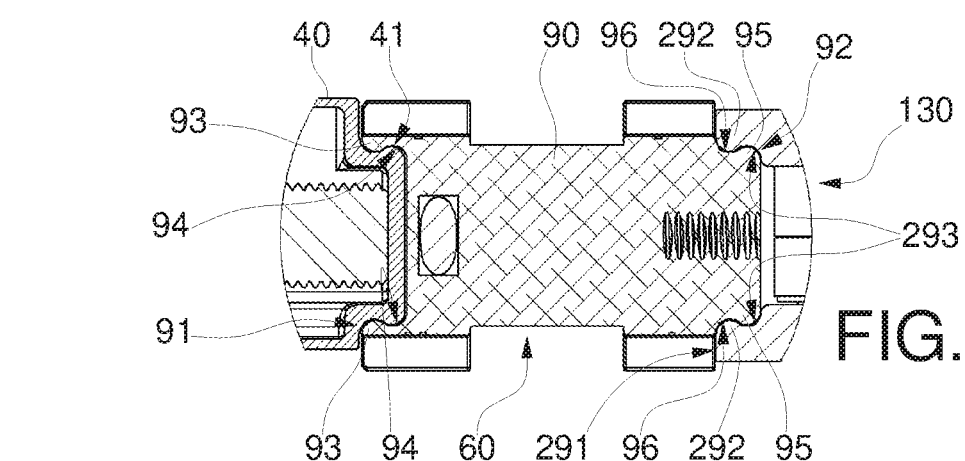
FIG. 9 is a detail of FIG. 7.
Figure 10:
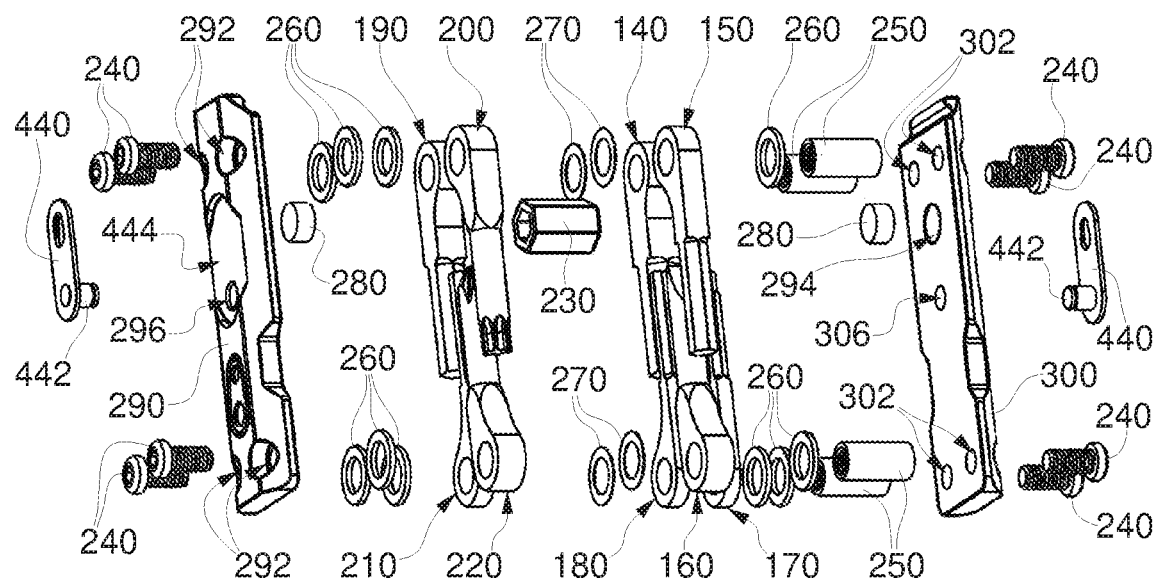
FIG. 10 is an exploded view of the first multi-tool assembly of the tool storage assembly.
Figure 11:
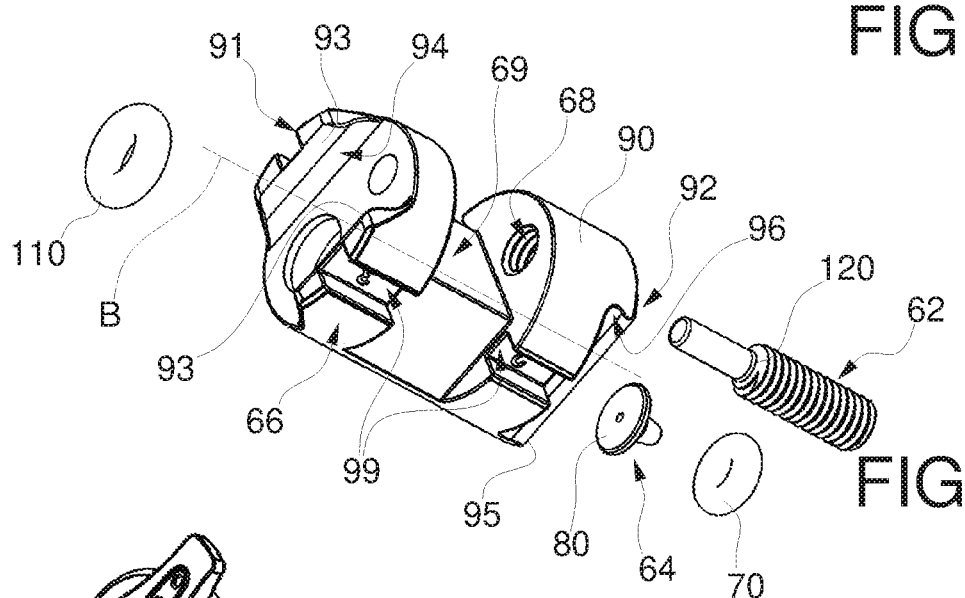
FIG. 11 is an exploded view of the second multi-tool assembly of the tool storage assembly.

With particular reference to FIG. 9, first multi-tool assembly 130 includes a first pair of hook-shaped (or dovetail-shaped) sliding connection portions 291; they are arranged, at one end of the multi-tool assembly 130, in a mirror image with respect to a center plane of the first multi-tool assembly 130.

The first pair of hook-shaped (or dovetail-shaped) sliding connection portions 291 can be arranged to define, between them, a surface concavity, or a surface convexity.

In the specific embodiment shown in the attached figures, the first pair of hook-shaped (or dovetail-shaped) sliding connection portions 291 of the first multi-tool assembly 130 are arranged to define, between them, a surface concavity.

Second multi-tool assembly 60 includes two second pairs of hook-shaped (or dovetail-shaped) sliding connection portions 91,92; they are arranged, at both ends of the second multi-tool assembly 60, in a mirror image with respect to a center plane of the second multi-tool assembly 60 (to which the axis of cylindrical symmetry B of body 90 belongs).

The second pairs of hook-shaped (or dovetail-shaped) sliding connection portions 91,92 can be arranged to define, between them, a surface concavity, or a surface convexity.

In the specific embodiment shown in the attached figures, the two second pairs of hook-shaped (or dovetail-shaped) sliding connection portions 91,92 of the second multi-tool assembly 60 are arranged to define, between them, respectively, a surface concavity (at one end) and a surface convexity (at the other end).

Container assembly 20 includes a third pair of hook-shaped (or dovetail-shaped) sliding connection portions 41; they are arranged, at one end of the container assembly 20, in a mirror image with respect to a center plane of the container assembly 20 (to which the axis of cylindrical symmetry C of container 40 belongs).

The third pair of hook-shaped (or dovetail-shaped) sliding connection portions 41 are arranged at the end of container 40 which is opposite to its threaded opening 55.

The third pair of hook-shaped (or dovetail-shaped) sliding connection portions 41 can be arranged to define, between them, a surface concavity, or a surface convexity.

In the specific embodiment shown in the attached figures, the third pair of hook-shaped (or dovetail-shaped) sliding connection portions 41 of the container assembly 20 are arranged to define, between them, a surface convexity.

The arrangement of the pairs of hook-shaped (or dovetail-shaped) sliding connection portions 291, 91, 92, 41 of the first multi-tool assembly 130, second multi-tool assembly 60, and container assembly 20, could be any, in connection with specific application requirements.

As shown in the detail of FIG. 9, the first pair of hook-shaped (or dovetail-shaped) sliding connection portions 291 of the first multi-tool assembly 130 comprises two lips 292 and two grooves 293, facing each other (that is, facing inwards).

The two second pairs of hook-shaped (or dovetail-shaped) sliding connection portions 91,92 of the second multi-tool assembly 60 comprises two pairs of lips and grooves 93, 94 and 95, 96 which—at one end—are facing each other (facing inwards), and—at the other end—are facing outwards.

The third pair of hook-shaped (or dovetail-shaped) sliding connection portions 41 of the container assembly 20 includes two lips 42 and two grooves 43, facing outwards.

Figure 15:
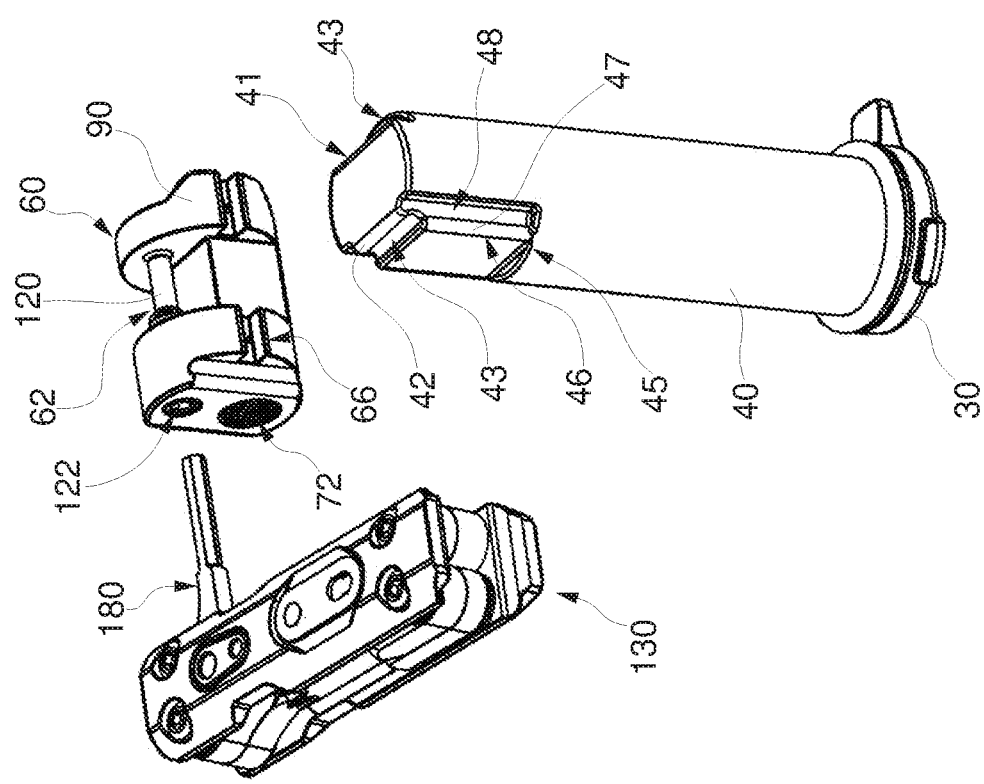
FIG. 15 is a partially exploded perspective view of the tool storage assembly.
Figure 17:
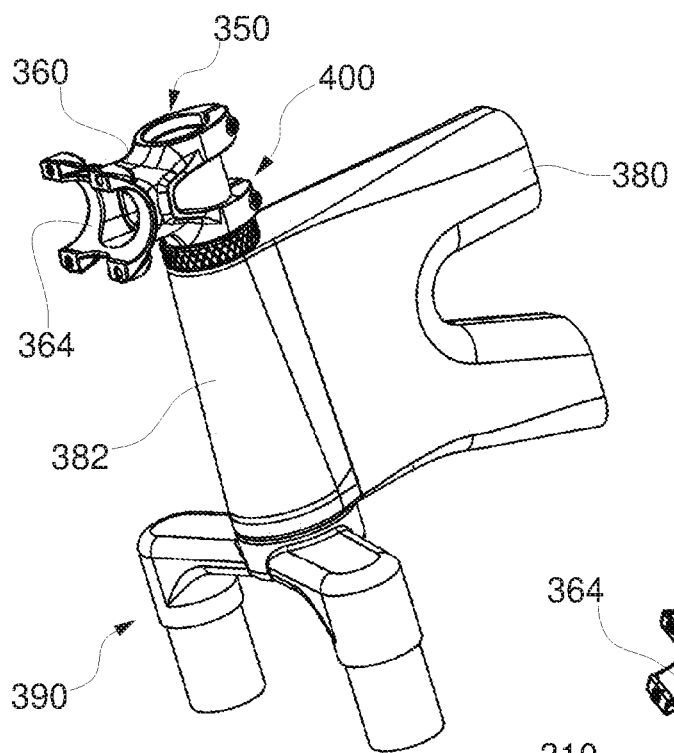
FIG. 17 is a perspective view of a head tube assembly according to the invention.
Figure 18:
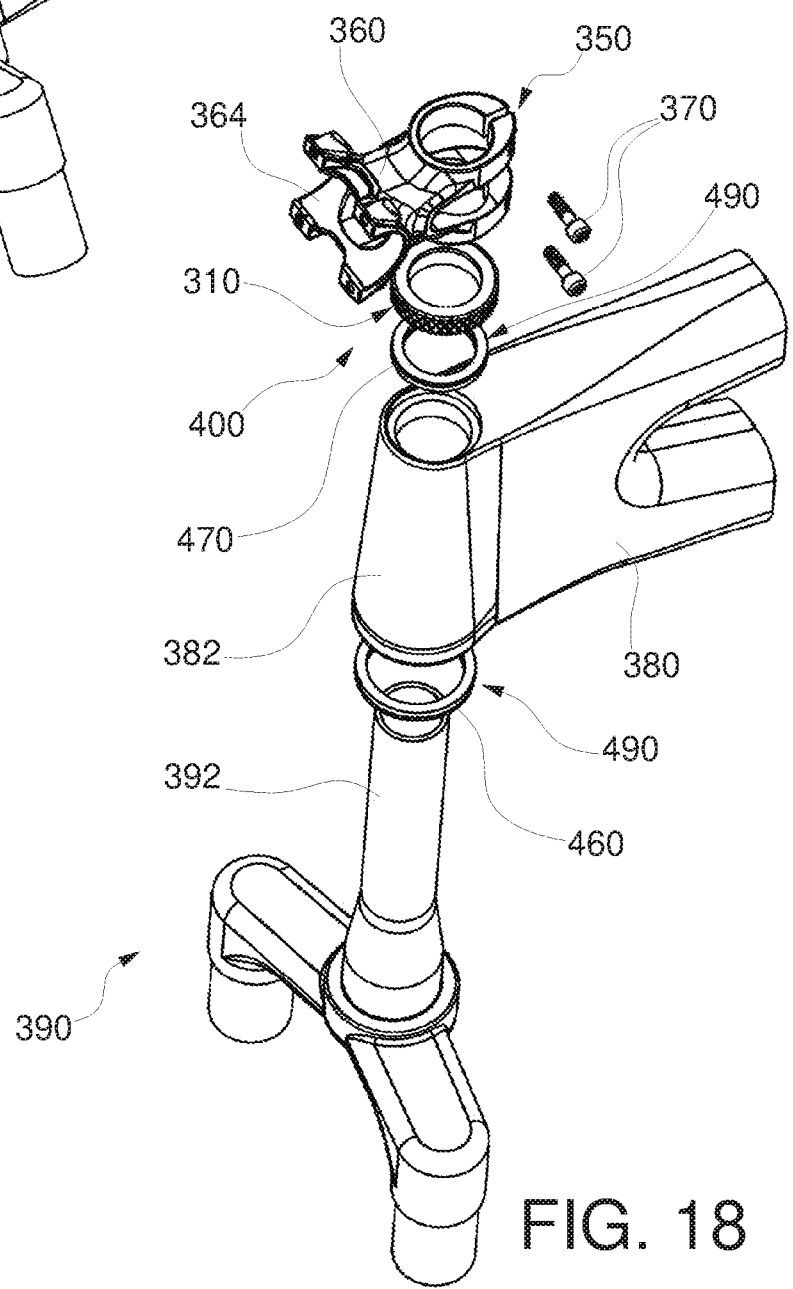
FIG. 18 is an exploded view of the head tube assembly shown in FIG. 8.

According to a further aspect of the invention, container assembly 20 includes a side connection area 45 for the second multi-tool assembly 60 (FIG. 15).

More in detail, container 40 includes a side connection area 45 for the second multi-tool assembly 60.

Figure 16:
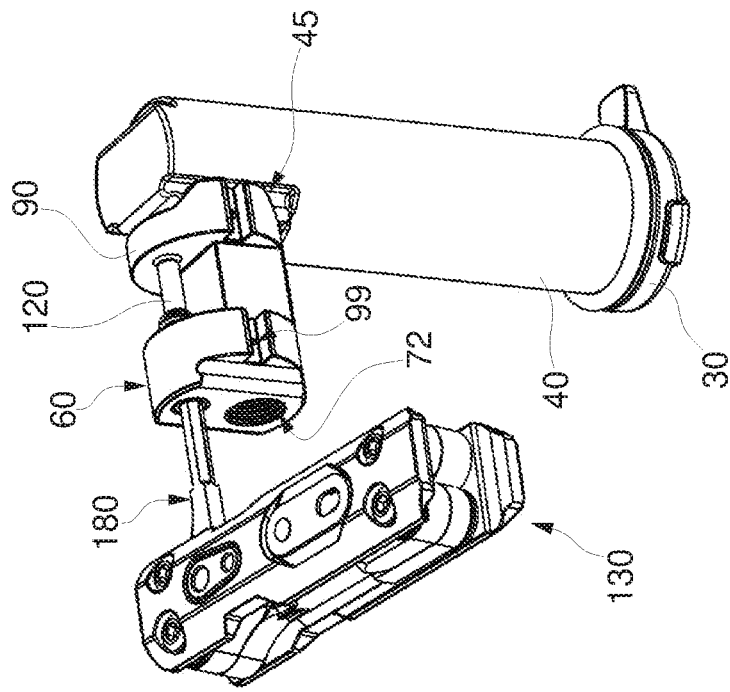
FIG. 16 is a further perspective view of the tool storage assembly, ready to repair a bicycle chain.

As shown in FIG. 16, side connection area 45 allows the second multi-tool assembly 60 to be connected to container 40 in such a way that the axis of the first screw pin 120 is perpendicular, or substantially perpendicular, to the axis of cylindrical symmetry C of container 40.

This connection configuration allows achieving a comfortable, and strong, handle for leverage, since a significant torque is required to break a bicycle chain (to push a chain pin out of position); in practical use, container 40 constitutes the handle.

Side connection area 45 includes a fourth pair of hook-shaped (or dovetail-shaped) sliding connection portions 46.

The fourth pair of hook-shaped (or dovetail-shaped) sliding connection portions 46 are arranged in such a way that their sliding direction is perpendicular to the sliding direction of the third pair of hook-shaped (or dovetail-shaped) sliding connection portions 41.

The fourth pair of hook-shaped (or dovetail-shaped) sliding connection portions 46 can be arranged to define, between them, a surface concavity, or a surface convexity.

In the specific embodiment shown in the attached figures, the fourth pair of hook-shaped (or dovetail-shaped) sliding connection portions 46 of side connection area 45 are arranged to define, between them, a surface convexity.

The fourth pair of hook-shaped (or dovetail-shaped) sliding connection portions 46 of side connection area 45 includes two lips 47 and two grooves 48, facing outwards.

As shown in FIG. 16, a simple and strong slideable connection is achieved between container 40 and body 90 of second multi-tool assembly 60.

To operate the chainbreaker 62, one of the tool bits 180 of the first multi-tool assembly 130 is pivoted out, and it is inserted in the hexagonal key socket 122 of first screw pin 120.

The sliding connection portions 291, 91, 92, 41, 46 allows extremely easy connection between the components of the tool storage assembly 10, a secure connection during storage, and easy separation once removed from storage.

Figure 12:
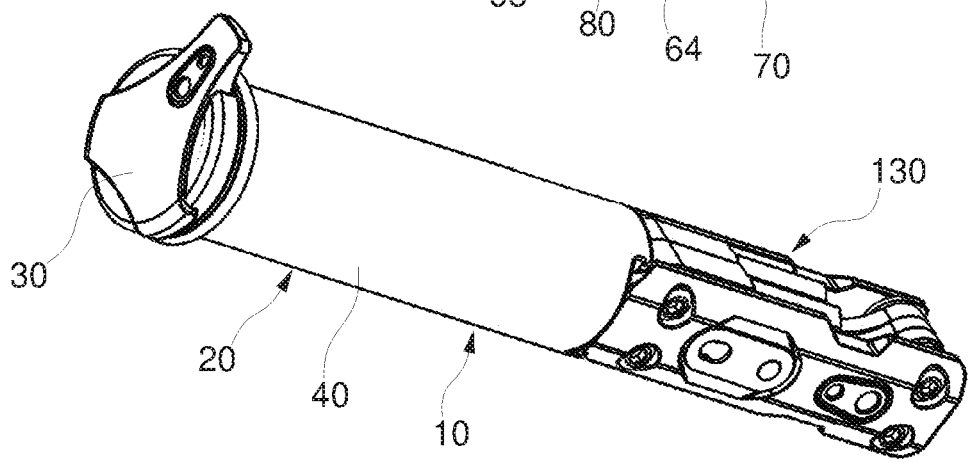
FIG. 12 is a perspective view of an alternative embodiment of the tool storage assembly according to the invention.
Figure 13:
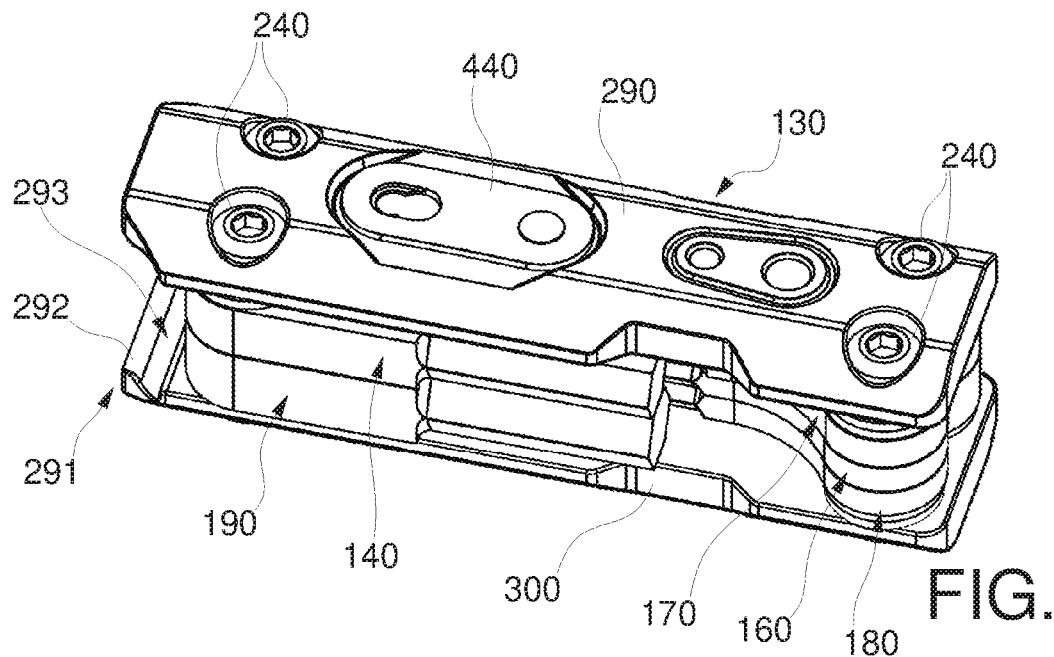
FIG. 13 is a perspective view of the first multi-tool assembly.
Figure 14:
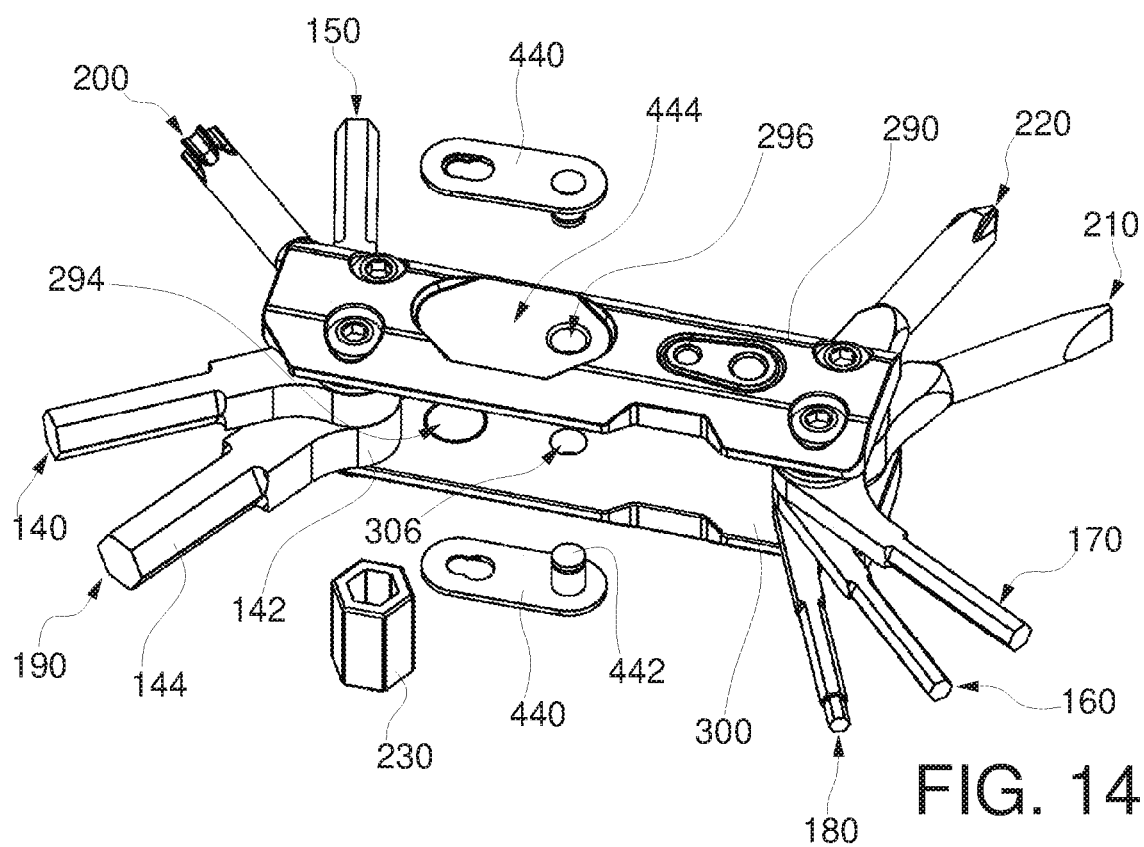
FIG. 14 is a partially exploded perspective view of the first multi-tool assembly, with the tool bits pivoted open.

FIG. 12 shows an alternative embodiment of the invention, wherein the tool storage assembly 10 only includes the container assembly 20 and the first multi-tool assembly 130, directly connected to each other.

In a further embodiment of the invention, not shown in the figures, the tool storage assembly 10 could include the container assembly 20 and the second multi-tool assembly 60, directly connected to each other.

According to a further aspect of the invention, a head tube assembly 400 is disclosed (FIGS. 17-28).

Head tube assembly 400 includes a head tube 382, which is a portion of a bicycle frame 380.

Figure 22:
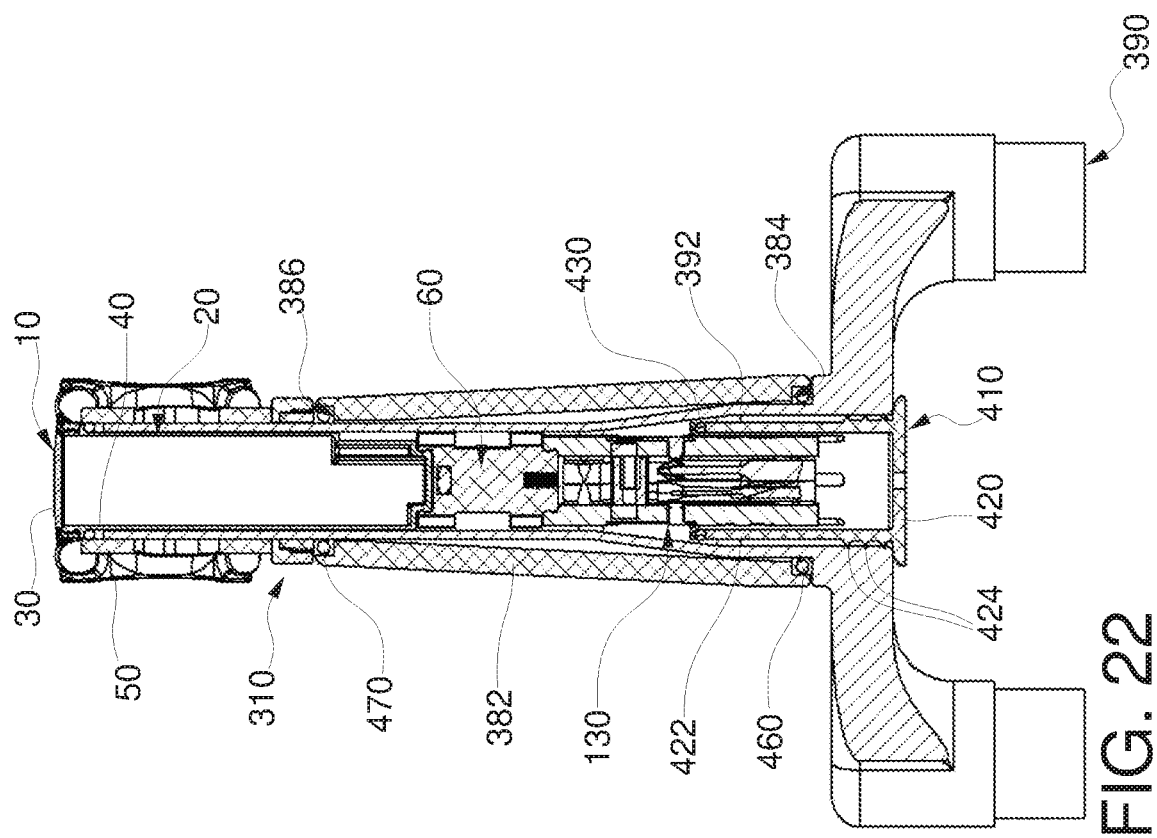
FIG. 22 is a cross sectional view of the head tube assembly, with the tool storage assembly installed.
Figure 23:
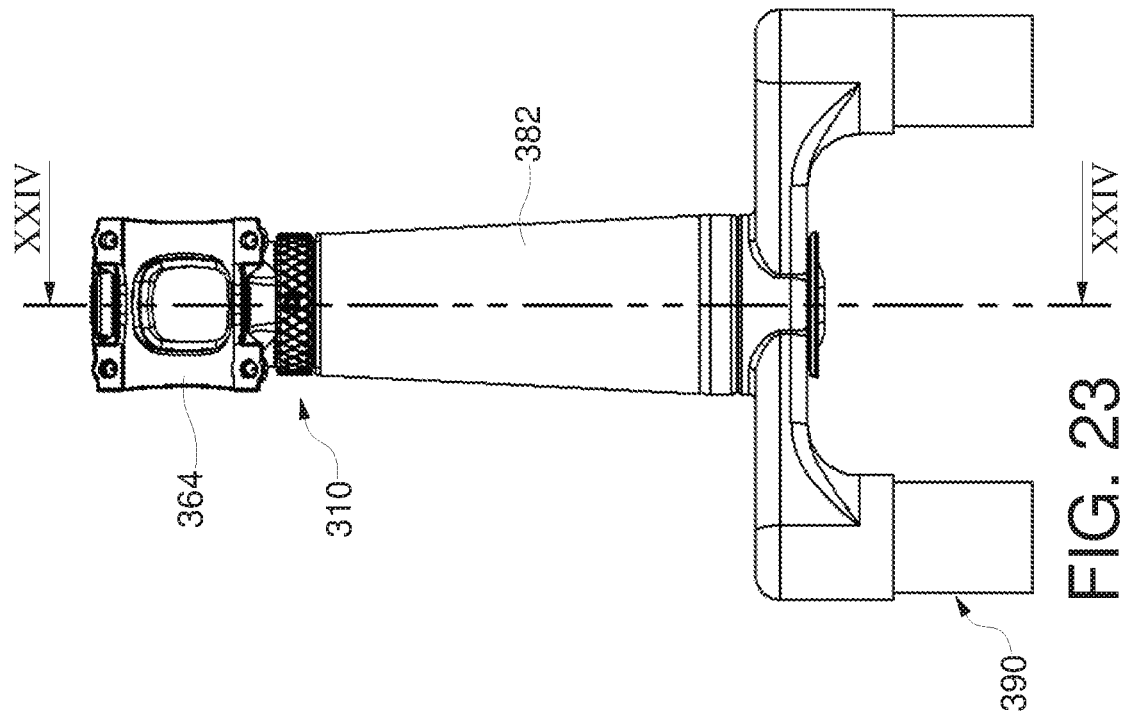
FIG. 23 is a front view of the head tube assembly, with the tool storage assembly installed.
Figure 24:
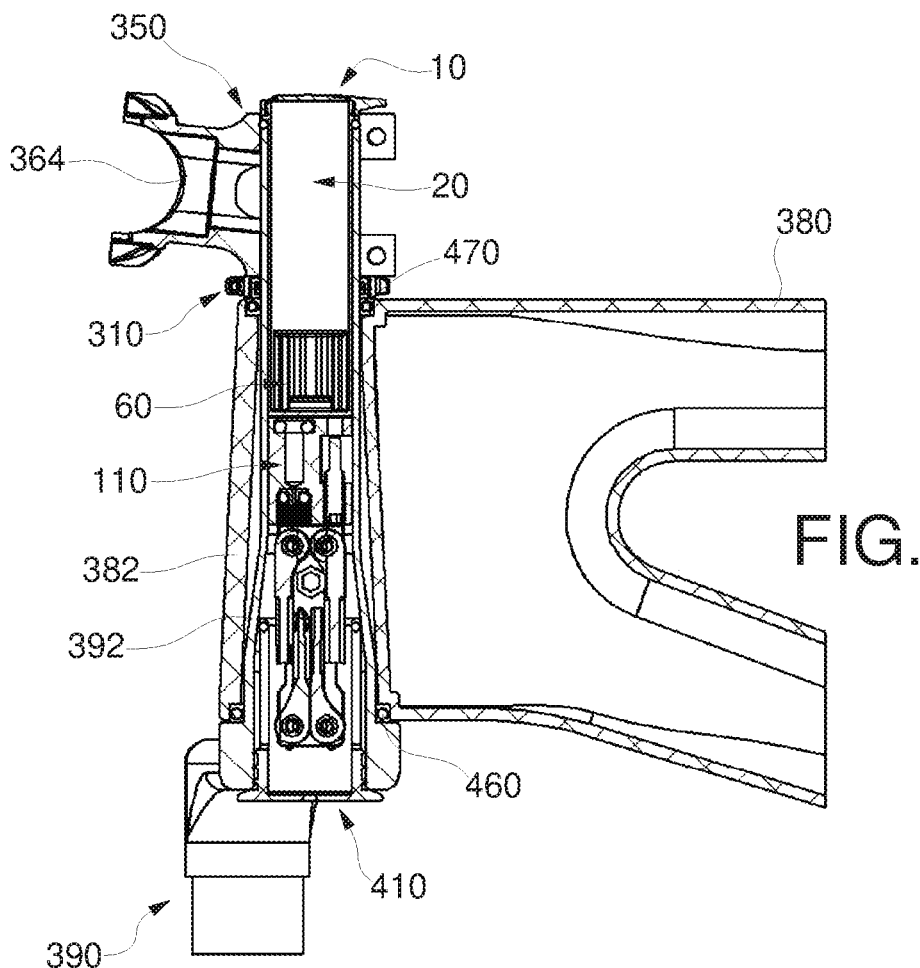
FIG. 24 is a further cross-sectional view of the head tube assembly, with the tool storage assembly installed, taken along plane XXIV-XXIV of FIG. 23.

Head tube 382 is tapered, with the largest section facing down, with reference to the configuration of use (see for example FIG. 22).

Head tube 382 includes, at its opposite ends, a first bearing recess 384 and a second bearing recess 386.

Head tube assembly 400 further includes a fork assembly 390; fork assembly 390, in turn, includes a fork tube 392.

Head tube assembly 400 further includes a stem assembly 350, and a headset assembly 490.

Stem assembly 350 is connected to fork tube 392, and it is configured to clamp a bicycle handlebar (not shown in the drawings).

More in detail, stem assembly 350 includes a stem body 360, and screws 370 which allow tightening stem body 360 at the top of fork tube 392.

Stem body 360 includes a clamp portion 364 which, together with a faceplate (not shown in the drawings) can clamp a bicycle handlebar.

Headset assembly 490 includes a first bearing assembly 460 (in detail, a first angular contact bearing assembly 460), and a second bearing assembly 470 (in detail, a second angular contact bearing assembly 470); the first bearing assembly 460 and the second bearing assembly 470 are inserted along fork tube 392, and they are press fit, respectively, into first bearing recess 382 and second bearing recess 384.

Figure 1:
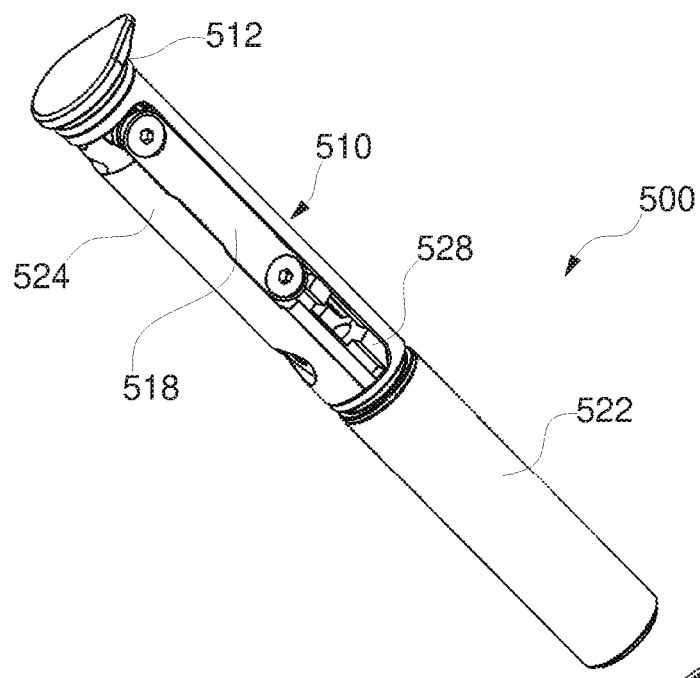
FIG. 1 is a perspective view of a prior art tool kit for bicycle tools.
Figure 2:
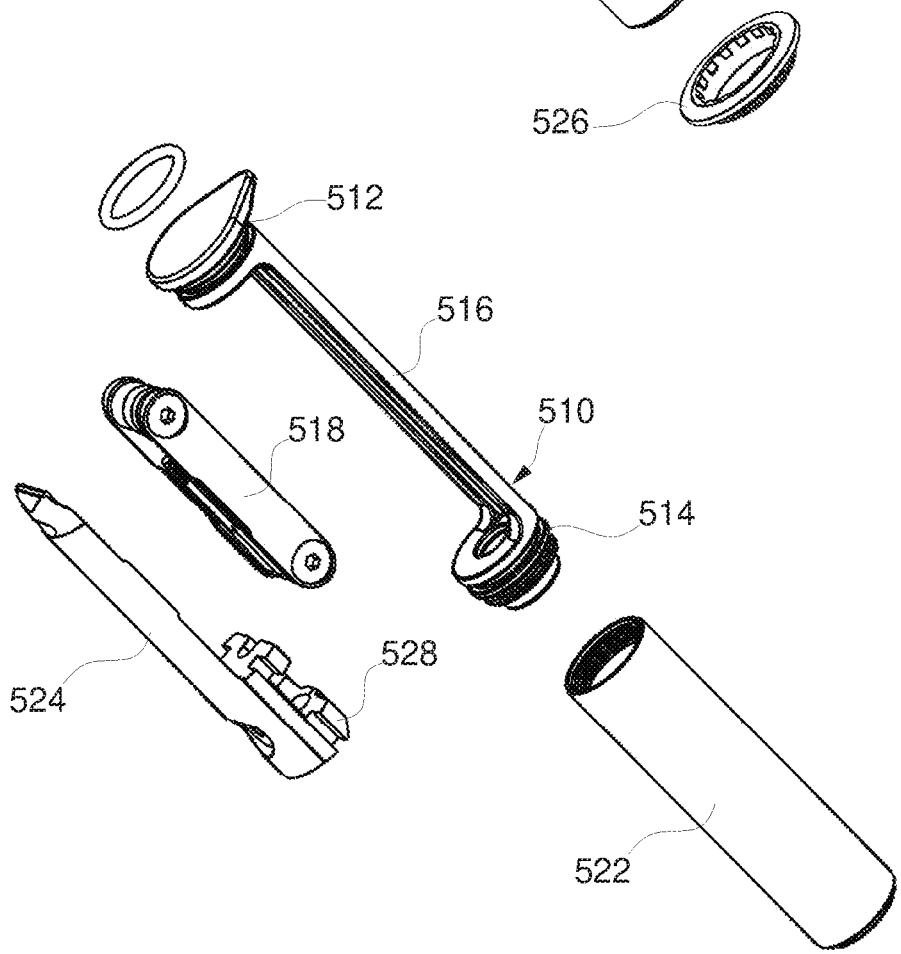
FIG. 2 is an exploded view of the tool kit shown in FIG. 1.
Figure 3:
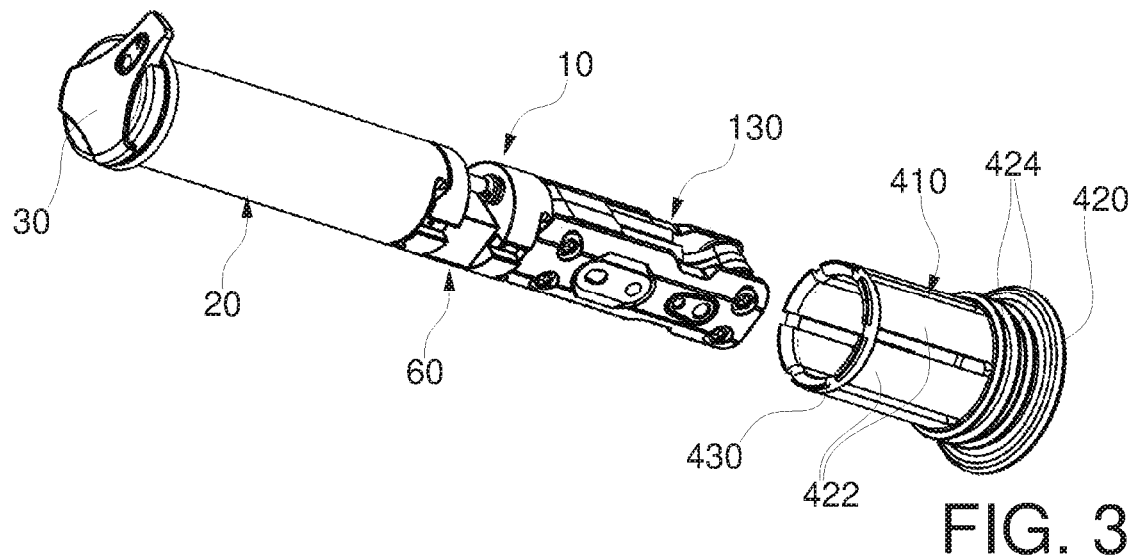
FIG. 3 is a perspective view of a preferred embodiment of the tool storage assembly according to the invention.
Figure 4:
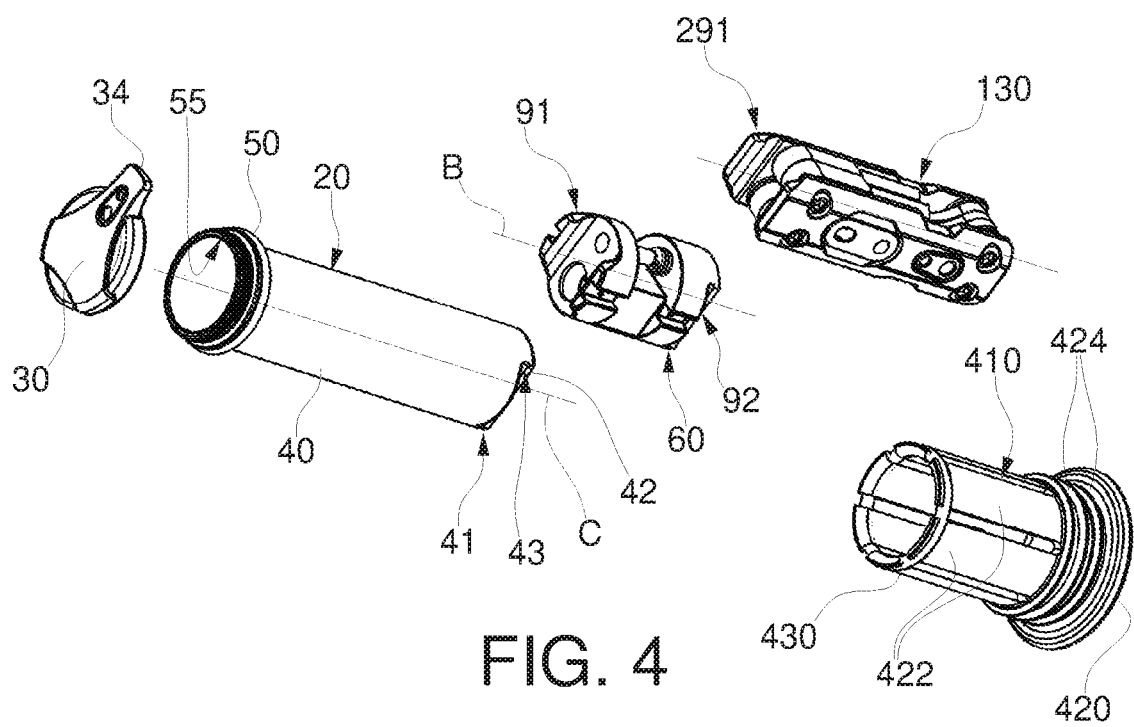
FIG. 4 is an exploded view of the tool storage assembly shown in FIG. 3.
Figure 5:
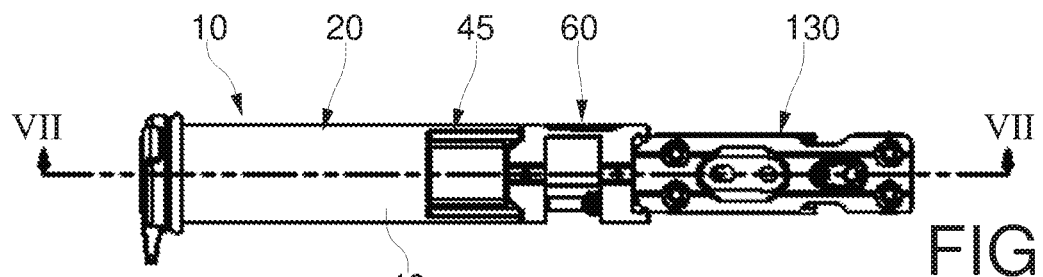
FIG. 5 is a side view of the tool storage assembly.
Figure 6:
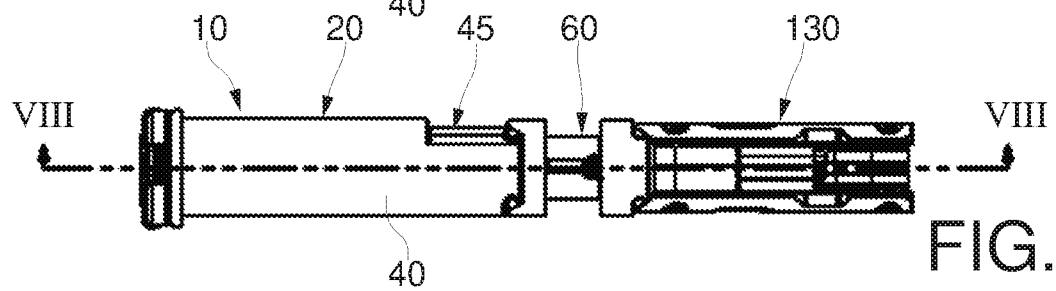
FIG. 6 is a top view of the tool storage assembly.

Head tube assembly 400 could also include a bottom plug assembly 410, installed in the bottom of the fork tube 392 (see also FIGS. 3, 4).

As better explained later, bottom plug assembly 410, when installed, provides more stability to tool storage assembly 10, when inserted inside the fork tube 392 (FIG. 20), and it prevents dirt, debris, and contaminants from entering the fork tube 392.

Bottom plug assembly 410 includes a plug body 420, and an O-ring 430. Plug body 420 includes a plurality of legs 422, arranged longitudinally, and ribs 424.

Plug body 420 is made of a flexible material, such as nylon, so that legs 422 can flex open slightly.

Thanks to this feature, plug body 420 can accept insertion of tool storage assembly 10, according to the invention, in order to help prevent rattling between the tool storage assembly 10 and fork tube 392.

O-ring 430 fits around legs 422, to provide additional leg spring action.

Ribs 424 are configured to press fit plug body 420 into fork tube 392.

According to a further aspect of the invention, head tube assembly 400 includes a headset tightener 310.

Headset tightener 310 is configured to properly tighten the headset assembly 490, as will be further discussed.

By using such headset tightener 310 according to the invention, which does not decrease the internal diameter of the bicycle fork tube 392, the latter can house tools components which are slightly bigger, and this has a profound effect on usefulness of those tool components.

Importantly, headset tightener 310 does not require threading inside of fork tube 392, as is required with some of the prior art devices.

In this way, the fork tube 392 is stronger, and the installation process is much easier and less expensive, because no special thread tap is required, and the system works with any steer tube material.

Headset tightener 310, according to the invention (FIGS. 27, 28), includes an outer ring 320 and an inner ring 330, connected by a threaded coupling; inner ring 330 is configured to engage the top of fork tube 392.

More in detail, outer ring 320 includes an inner thread 328; correspondingly, inner ring 330 includes an outer thread 332, which engages the inner thread 328 of outer ring 320.

Inner ring 330 further includes an inner channel 321.

Outer ring 320 includes a split 322; split 322 is arranged radially.

Outer ring 320 further includes peripheral contours 323, 324,325,326.

Particularly, contours 325,326 are divided by split 322; contours 325,326 include respective holes 327a,327b, of which first hole 327a smooth, and second hole 327b threaded.

Outer ring 320 further includes a screw 340, whose thread 342 is engaged in threaded second hole 327b.

The purpose of contours 323,324,325,326 is to provide enough grip, when turning outer ring 320 by hand, in order to provide enough preload force of headset assembly 490.

Headset tightener 310 further includes two O-rings 450; O-rings 450 fit inner channel 321, such that when outer ring 320 is pushed onto fork tube 392, there is sufficient friction to rotationally fix inner ring 330 to fork tube 392, and inner ring 330 does not rotate relative to fork tube 392 as outer ring 320 is rotated.

Figure 25:
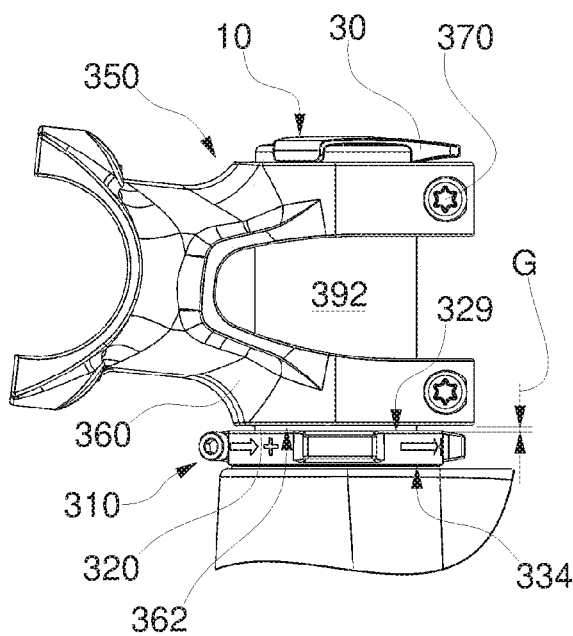
FIG. 25 is a side view of the head tube assembly, with the tool storage assembly installed, before the headset tightener is tightened.

FIG. 25 shows headset tightener 310 prior to tightening headset assembly 490.

In actual practice, during assembly of the fork tube 392, first and second bearing assemblies 460 and 470, head tube 382, headset tightener 310 and stem assembly 350 are pushed together by hand, and stem screws 370 are tightened to fix stem body 360 to fork tube 392.

FIG. 25 shows, for the purposes of description, gap G between the top surface 329 of outer ring 320 and the bottom surface 362 of stem body 360, which, in actual practice, would be so small as to be invisible, because head tube assembly 400 would be pushed together by hand prior to tightening screws 370.

Screw 340 is loose enough, to allow rotational threaded movement between outer ring 320 and inner ring 330.

As outer ring 320 is rotated by hand, gap G will close, and then further rotation will cause first and second bearing assemblies 460 and 470 to be preloaded, removing play in the headset assembly 490.

Specifically, as outer ring 320 is rotated relative to inner ring 330, the distance between outer ring 320 top surface 329, and inner ring 330 bottom surface 334, will increase.

Figure 26:
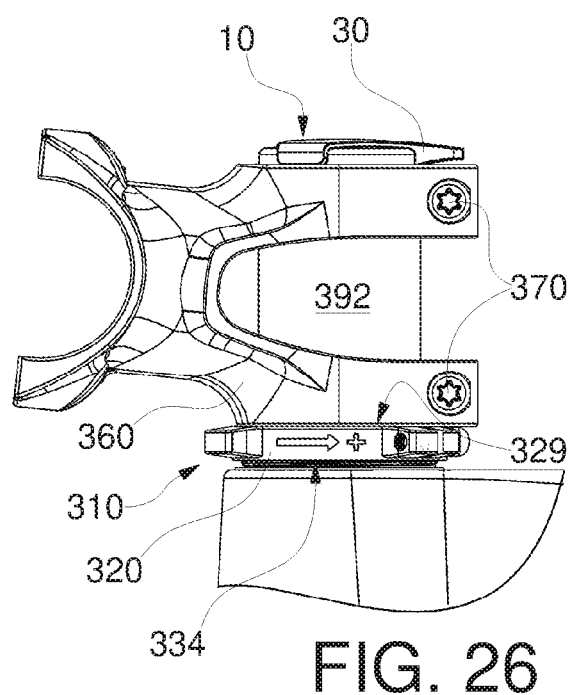
FIG. 26 is a side view of the head tube assembly, with the tool storage assembly installed, after the headset tightener is tightened.
Figure 27:
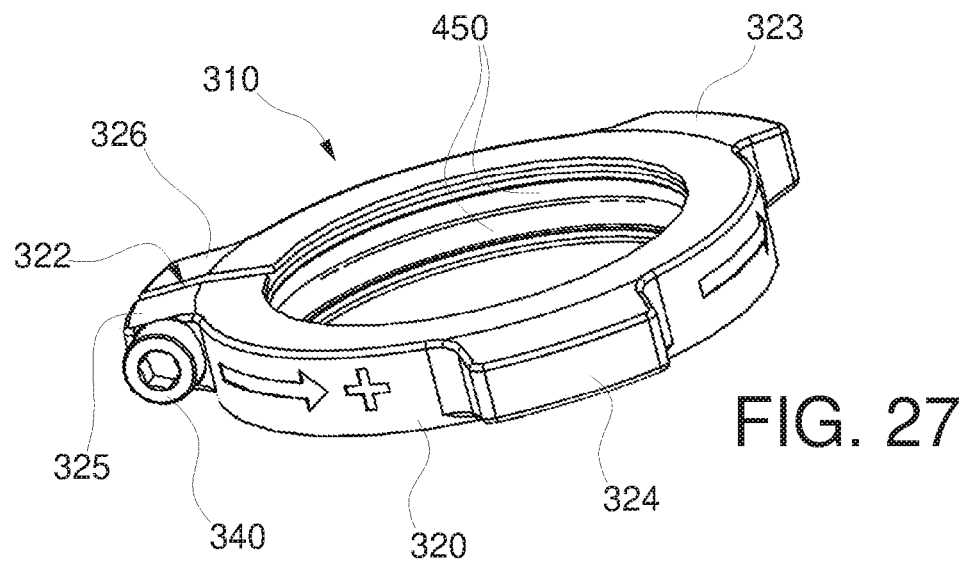
FIG. 27 is a perspective view of the headset tightener of the head tube assembly.
Figure 28:
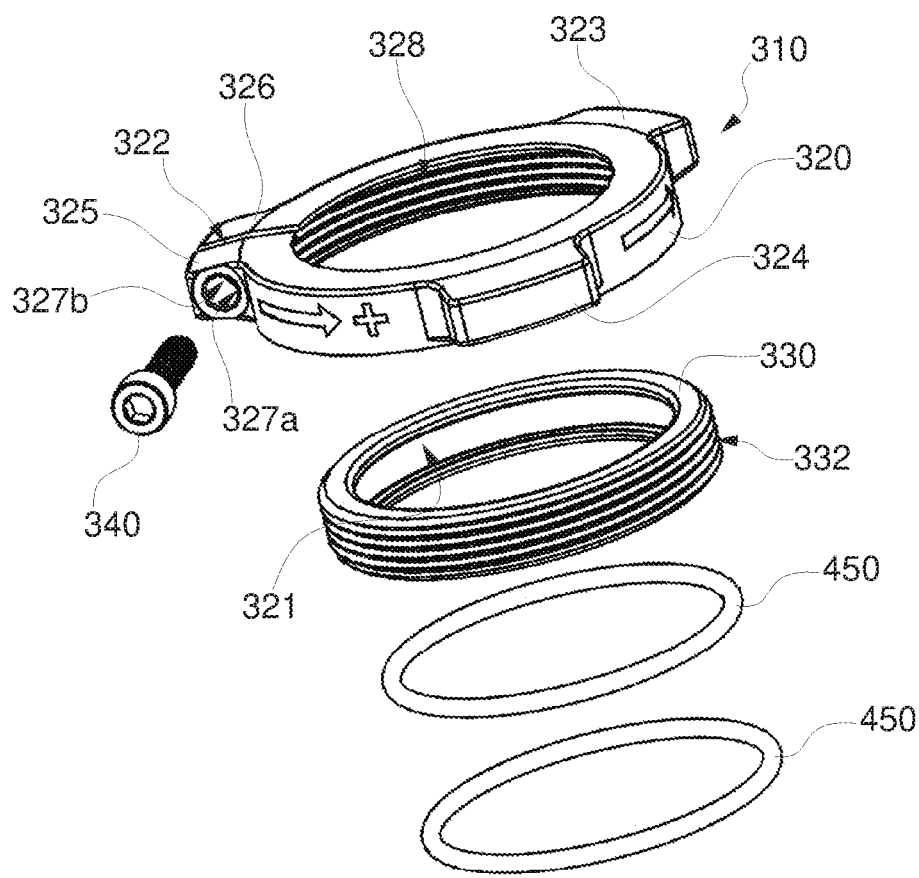
FIG. 28 is an exploded view of the headset tightener.

FIG. 26 shows headset tightener 310 after tightening headset assembly 490.

By twisting outer ring 320 while inner ring 330 remains rotationally fixed to fork tube 392, outer ring 320 top surface 329 will push against stem body 360 bottom surface 362, while inner ring 330 bottom surface 334 pushes against the top of angular contact bearing 470.

Twisting outer ring 330 causes headset assembly 490 to be become preloaded, by axially loading first and second bearing assemblies 460,470.

Proper preloading is typically verified by feeling if handlebar rotation is smooth, and by applying the front brake and pushing the bike fore and aft to feel for play.

Once proper preload is achieved, screw 340 is tightened, so to decrease the size of split 322, to bind outer ring 320 to inner ring 330: this prevents headset tightener 310 from inadvertently loosening, and from causing play in the headset assembly 490.

As previously mentioned, and according to a further aspect of the invention, tool storage assembly 10, having the features disclosed above, can be installed into head tube assembly 400 according to the invention (more particularly, housed into fork tube 392).

For easy installation and removal, O-ring 50 of container assembly 20 frictionally fits into fork tube 392.

Flange 34 of lid 30 is greater than the inside diameter of fork tube 392, to ensure that lid 30 remains above the top of fork tube 392, for safe and easy removal of tool storage assembly 10.

The outer diameter of first multi-tool assembly 130, second multi-tool assembly 60, and container assembly 20 is slightly smaller than the internal diameter of fork tube 392.

It is also emphasized that second multi-tool assembly 60, having the features disclosed above, represents an original combination of a chainbreaker and a $CO_2$ inflator, which is accomplished in a very compact and handy way.

It has thus been seen how the invention achieves the proposed aims.

In the embodiments previously disclosed individual features, given in connection with such specific embodiments, may actually be interchanged with other different features that exist in other embodiments.

The present invention has been described according to preferred embodiments, but equivalent variants can be devised without departing from the scope of protection offered by the following claims.

The invention claimed is:

1. A tool storage assembly, comprising:
   a container assembly, and
   at least one multi-tool assembly, removably connected to said container assembly, wherein said container assembly and said multi-tool assembly comprise respective sliding connection portions that engage each other, wherein said sliding connection portions of the container assembly and multi-tool assembly are either hook shaped or dovetail-shaped,
   wherein said container assembly and said multi-tool assembly are removably connected to each other so to be mutually aligned along an axis, and wherein said sliding connection portions are configured to engage/disengage each other, in a sliding manner, along directions perpendicular to said axis,
   wherein said at least one multi-tool assembly comprises a second multi-tool assembly including a chainbreaker including a first screw pin, and wherein said container includes a side connection area for said second multi-tool assembly, which allows said second multi-tool assembly to be connected to said container in such a way that an axis of said first screw pin is perpendicular to an axis of said container, so that said container can be used as a handle for operating said chainbreaker, and
   wherein said side connection area includes hook-shaped or dovetail shaped sliding connection portions.

2. The tool storage assembly according to claim 1, wherein said multi-tool assembly further comprising a first multi-tool assembly including a plurality of tool bits, each of which is movable between a respective inactive position, and a respective operative position, in which each tool bit can be used, according to its specific function.

3. The tool storage assembly according to claim 2, wherein said first multi-tool assembly includes a first frame bar and a second frame bar, reciprocally connected by a plurality of threaded axles and respective screws, and wherein a number of tool bits is pivoted around each of said threaded axles, wherein each of said tool bits include a pivot portion, inserted along one of said threaded axles, and an operative portion, wherein said operative portion includes a screwdriver, or an Allen wrench.

4. The tool storage assembly according to claim 1, wherein said second multi-tool assembly, further comprising a CO2 inflator, and/or a spoke wrench.

5. The tool storage assembly according to claim 4, wherein said second multi-tool assembly includes a substantially cylindrical-shaped body, and wherein said chainbreaker includes a first threaded seat, made in said body, and said first screw pin, which is engaged in said first threaded seat.

6. The tool storage assembly according to claim 4, wherein said $CO_2$ inflator includes a second threaded seat, made in said body, and a second screw pin which is engaged in said second threaded seat.

7. The tool storage assembly according to claim 4, wherein said spoke wrench includes spoke wrench slots, of various standard sizes, made in said body.

8. The tool storage assembly according to claim 1, wherein said container assembly includes a container, which is cylindrical shaped or substantially cylindrical shaped, and a lid, associated with said container, wherein said lid includes a flange.

9. A multi-tool assembly comprising: a substantially cylindrical-shaped body having an axis of cylindrical symmetry along a longitudinal direction, a chainbreaker and a $CO_2$ inflator,
   wherein said chainbreaker includes a first threaded seat, made in said body, and a first screw pin, which is engaged in said first threaded seat, and wherein said CO2 inflator includes a second threaded seat, made in said body, and a second screw pin, which is engaged in said second threaded seat,
   wherein in an in-use condition, both an axis of the first threaded seat is parallel to the axis of cylindrical symmetry of the body and
   an axis of the second threaded seat is parallel to the axis of cylindrical symmetry of the body
   and at least one sliding connection configured to attach to a tool storage assembly.

10. The multi-tool assembly, according to claim 9, including a spoke wrench slots, of various standard sizes, made in said body.

11. A tool storage assembly, comprising
   a container assembly comprising at least one pair of sliding connection portions situated at one end of the container assembly; and
   at least one multi-tool assembly comprising two pairs of sliding connection portions, each pair at opposing ends of said at least one multi-tool assembly,
   wherein said at least one multi-tool assembly is removably connected to said container assembly by engaging said at least one pair of sliding connection portions of the container assembly with one pair of sliding connection portions of the at least one multi-tool assembly,
   wherein said sliding connection portions of the container assembly are arranged in a mirror image with respect to a center plane of the container assembly and wherein said sliding connection portions of the multi-tool assembly are arranged in a minor image with respect to a center plane of the at least one multi-tool assembly,
   wherein said at least one multi-tool assembly includes a second multi-tool assembly including a chainbreaker including a first screw pin, and wherein said container includes a side connection area for said second multi-tool assembly, which allows said second multi-tool assembly to be connected to said container in such a way that an axis of said first screw pin is perpendicular to an axis of said container, so that said container can be used as a handle for operating said chainbreaker, and
   wherein said side connection area includes hook-shaped or dovetail shaped sliding connection portions.

* * * * *